H. ROBERTS.
HAT PIN GUARD.
APPLICATION FILED MAR. 15, 1911.
1,019,840.
Patented Mar. 12, 1912.
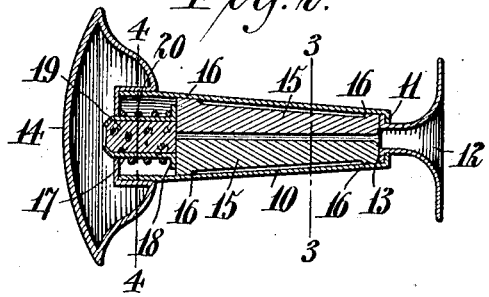
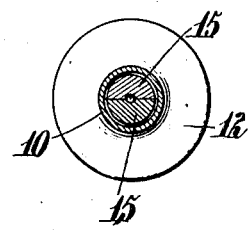
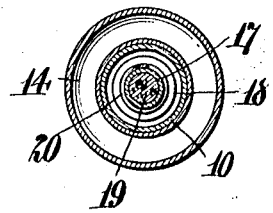
Witnesses:
Christ Feinle, Jr.
P. A. Hoster
Inventor,
Harry Roberts.
By Victor J. Evans,
Attorney.

UNITED STATES PATENT OFFICE.

HARRY ROBERTS, OF ATLANTIC CITY, NEW JERSEY.

HAT-PIN GUARD.

1,019,840.  Specification of Letters Patent.  Patented Mar. 12, 1912.

Application filed March 15, 1911. Serial No. 614,667.

*To all whom it may concern:*

Be it known that I, HARRY ROBERTS, a citizen of the United States, residing at Atlantic City, in the county of Atlantic and State of New Jersey, have invented new and useful Improvements in Hat-Pin Guards, of which the following is a specification.

An object of the invention is to provide a guard for hat pins and adapted for attachment to the pointed end of the hat pin to substantially cover the said point.

A further object of the invention is to provide a means for attachment to the pointed end of a hat pin to prevent the hat pin accidentally becoming disengaged from the hat.

For the purpose mentioned, use is made of a conically shaped casing having an open end with a knob secured to the other end of the casing, a plurality of slidable jaws mounted in the casing, a spring disposed in the casing and adapted to normally position the jaws in relative engagement, a presser knob mounted in the casing and adapted to engage the ends of the said jaws so that when the presser knob is moved to engage the jaws the same will tend to move relatively outward so that the pointed end of a hat pin can be received between the jaws, the said jaws assuming their normal position when pressure is released from the presser knob.

Reference is to be had to the accompanying drawings constituting a part of this specification, in which similar characters of reference denote corresponding parts in all the views, and in which—

Figure 1 is a perspective view of a hat pin positioned in a hat and having my device attached to the pointed end thereof. Fig. 2 is a longitudinal sectional view of my device. Fig. 3 is a transverse section taken on the line 3—3 in Fig. 2. Fig. 4 is a transverse section taken on the line 4—4 in Fig. 2.

Referring more particularly to the views, I provide a casing 10 having a shape similar to a frustum of a cone, the smaller end of the said casing being bent inwardly to form a stop lug 11 for a presser knob 12 mounted to extend into the smaller end of the casing and having a laterally extending circular flange 13 formed on the inner end thereof, the said flange extending outwardly beneath the lug 11. The larger end of the casing 10 has secured thereto a knob 14, preferably circular in shape and having its outer surface fancifully designed. Slidably mounted in the casing 10 and extending longitudinally thereof are a plurality of jaws 15, the said jaws having a frusto-conical shape similar to the casing 10 and provided adjacent their ends and on the exterior sides thereof with integral flanges 16, the said flanges extending peripherally of the jaws. Slidably mounted in the knob 14 and extending outwardly therefrom is a casing 17 having a laterally extending flange 18 adapted to engage the larger ends of the jaws 15 and disposed in the said casing 17 is a penetrable substance 19, preferably a cork. An expansible spring 20 is disposed to encircle the casing 17, the said spring being positioned between the flange 18 of the casing and the knob 14, the said knob constituting bearing surfaces for the said spring.

In the application of my device to a hat pin when it is desired to attach the device to the pointed end of the hat pin, the presser knob 12 is moved inwardly in the casing 10 to engage the jaws 15, thus pressing them downwardly against the upward action of the spring 20 and expanding or moving the said jaws apart. The pointed end of the hat pin is then inserted to pass through the casing 10 and the pointed end of the hat pin is embedded in the penetrable substance 19, after which the downward pressure on the presser knob 12 is released and the expansible action of the spring 20 will move the jaws 15 upwardly to their normal position, thus tending to move the jaws together so that they will substantially grip the end of the hat pin and retain the same in the casing 10. To release the pointed end of the hat pin from engagement with my device, the presser knob 12 must first be moved to engage the jaws 15 to separate the same so that they will be disengaged from the hat pin, thus permitting the operator to withdraw the hat pin guard from engagement with the hat pin.

Having thus fully described the invention, what I claim as new, is:—

1. A hat pin guard comprising a frusto-conically shaped casing, a knob secured to the larger end of the casing, a plurality of frusto-conically shaped jaws slidably mounted in the casing, a presser knob mounted to extend into the smaller end of the said casing and adapted to engage the said jaws, a spring actuated casing mounted in the said knob and extending outwardly therefrom to engage the said jaws at the larger ends thereof to normally hold the said jaws in engaging position and a penetrable substance disposed in the said spring actuated casing and adapted to receive the pointed end of the hat pin when the same is extended into the casing to be gripped by the said jaws.

2. A hat pin guard comprising a frusto-conically shaped casing having the smaller end thereof bent inwardly to form a circular stop lug, a plurality of jaws slidably mounted in the said casing, a knob secured to the larger end of the said casing, a spring actuated casing mounted in the said knob and extending outwardly therefrom to engage the said jaws and normally position the jaws to engage the pin, a penetrable substance disposed in the said spring actuated casing and adapted to receive the pointed end of a hat pin and a presser knob mounted to extend into the smaller end of the said casing and adapted to engage the said jaws to disengage the same from the pin, the said stop lug formed on the casing being adapted to limit the outward movement of the said presser knob.

3. A hat pin guard comprising a tapered casing for receiving a hat pin and having the smaller end thereof bent inwardly to form a stop lug, a plurality of jaws slidably mounted in the said casing, a presser knob mounted to extend through the smaller end of the said casing and engaging the said jaws, means for pressing the jaws inwardly against the presser knob and into engagement with the pin, the said stop lug being adapted to limit the outward movement of the presser knob and a penetrable substance disposed in the said casing and adapted to receive the pointed end of the said pin.

In testimony whereof I affix my signature in presence of two witnesses.

HARRY ROBERTS.

Witnesses:
HARRY J. LEE,
JAMES D. MASON.

---

Copies of this patent may be obtained for five cents each, by addressing the "Commissioner of Patents, Washington, D. C."